US012529847B2

(12) United States Patent
Mahalingam et al.

(10) Patent No.: US 12,529,847 B2
(45) Date of Patent: Jan. 20, 2026

(54) MULTI-LAYER SILICON PHOTONICS APPARATUS (71) Applicant: Intel Corporation, Santa Clara, CA (US)

(72) Inventors: Hari Mahalingam, San Jose, CA (US); Harel Frish, Albuquerque, NM (US); Sean McCargar, Rio Ranch, NM (US); Joshua Keener, Albuquerque, NM (US); Shane Yerkes, Placitas, NM (US); John Heck, Berkeley, CA (US); Ling Liao, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/750,754

(22) Filed: Jun. 21, 2024

(65) Prior Publication Data
US 2024/0345319 A1 Oct. 17, 2024

Related U.S. Application Data (63) Continuation of application No. 17/004,429, filed on Aug. 27, 2020, now Pat. No. 12,019,270.

(51) Int. Cl.
G02B 6/122 (2006.01)
G02B 6/13 (2006.01)
G02B 6/26 (2006.01)
G02B 6/30 (2006.01)

(52) U.S. Cl.
CPC ............. *G02B 6/1228* (2013.01); *G02B 6/13* (2013.01); *G02B 6/26* (2013.01); *G02B 6/305* (2013.01)

(58) Field of Classification Search
CPC .............................. G02B 6/1228; G02B 6/305
See application file for complete search history.

(56) References Cited

U.S. PATENT DOCUMENTS

| 11,163,115 B1 | 11/2021 | Gehl et al. | |
| 2004/0017976 A1* | 1/2004 | Luo | G02B 6/1228 385/28 |
| 2004/0202440 A1* | 10/2004 | Gothoskar | G02B 6/1228 385/129 |
| 2006/0115215 A1 | 6/2006 | Liu | |

(Continued)

FOREIGN PATENT DOCUMENTS

CN 209417340 U 9/2019
WO WO 2016/022070 A1 * 11/2016

OTHER PUBLICATIONS

T. Giewont et al., "300-mm monolithic silicon photonics foundry technology", IEEE Journal of Selected Topics in Quantum Electronics, vol. 25, No. 5, Sep./Oct. 2019, 11 Pages.

(Continued)

*Primary Examiner* — Michael Stahl
(74) *Attorney, Agent, or Firm* — Schwabe, Williamson & Wyatt, P.C.

(57) ABSTRACT

Embodiments of the present disclosure are directed to low numerical aperture (NA) optical couplers, or spot size converters, that include a lateral taper section and/or a vertical adiabatic taper section. In embodiments, the optical couplers may be positioned on a silicon substrate proximate to V-grooves within the substrate to contain optical fibers to self-align and to couple with the optical couplers. Other embodiments may be described and/or claimed.

17 Claims, 8 Drawing Sheets

(56) References Cited

U.S. PATENT DOCUMENTS

| | | | | |
|---|---|---|---|---|
| 2007/0286552 | A1* | 12/2007 | Aalto | G02B 6/125 385/50 |
| 2012/0328243 | A1* | 12/2012 | Fang | G02B 6/305 385/50 |
| 2015/0219853 | A1 | 8/2015 | Kumar et al. | |
| 2015/0247974 | A1* | 9/2015 | Painchaud | G02B 6/124 385/28 |
| 2015/0277054 | A1 | 10/2015 | Park et al. | |
| 2015/0346430 | A1* | 12/2015 | Li | G02B 6/14 385/28 |
| 2016/0131846 | A1 | 5/2016 | Ling et al. | |
| 2016/0351743 | A1 | 12/2016 | Yu et al. | |
| 2019/0146153 | A1* | 5/2019 | Park | G02B 6/1228 385/43 |
| 2020/0064554 | A1* | 2/2020 | Lin | G02B 6/34 |
| 2020/0257180 | A1* | 8/2020 | Mahgerefteh | G02F 1/2257 |

OTHER PUBLICATIONS

A. Khilo et al., "Efficient planar fiber-to-chip coupler based on two-stage adiabatic evolution", Optics Express, vol. 18, No. 15, Jul. 2010, pp. 15790-15806.

T. Barwicz et al., "Integrated metamaterial interfaces for self-aligned fiber to chip coupling in volume manufacturing", IEEE Journal of Selected Topics in Quantum Electronics, vol. 25, No. 3, May/Jun. 2019, 13 pages.

S. Fathololoumi et al., "1.6Tbps Silicon Photonics Transceiver Integrated Circuit for Co-Packaged Optics," Optical Fiber Communication Conference 2020, 3 pages.

J. Bauwelinck et al., "Silicon photonics technology for next-generation datacenter interconnects", IMEC Magazine, Dec. 2019 [retrieved on Feb. 15, 2014], Retrieved from the Internet <URL: https://www.imec-int.com/en/imec-magazine/imec-magazine-december- 2019/silicon-photonics-technology-for-next-generation-datacenter-interconnect>.

* cited by examiner

MULTI-LAYER SILICON PHOTONICS APPARATUS

RELATED APPLICATIONS

The present application is a continuation of U.S. application Ser. No. 17/004,429 filed Aug. 27, 2020 entitled "MULTI-LAYER SILICON PHOTONICS APPARATUS", the entire disclosure of which is incorporated herein by reference.

TECHNICAL FIELD

Embodiments of the present disclosure generally relate to the field of photonic integrated circuits (PIC), in particular to optical converters with low insertion loss and low back reflection.

BACKGROUND

Computing platforms are increasingly using photonic systems that use silicon as an optical medium. These photonic systems, which may be implemented as a PIC, attached to single mode fibers or arrays of fibers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Embodiments described herein include low numerical aperture (NA) optical couplers, which may also be referred to as spot size converters, that include a lateral taper section and a vertical adiabatic taper section. In embodiments, lateral tapering may be performed through standard lithography where the optical coupler includes no vertical tapering. 3-D grayscale lithography techniques may be used for vertical tapering. In embodiments, the optical couplers may be positioned on a substrate proximate to V-grooves in the substrate to self-align single mode fiber (SMF) that are to couple with the optical couplers.

High performance, robust, and low-cost packaging implementations to attach a standard SMF or array of fibers to a silicon photonics integrated chip requires a low loss optical coupling, for example 1-2 dB. For example, an optical coupling between a sub-micron silicon waveguide with a high NA, for example greater than 0.7, to a standard single mode fiber with a mode field diameter of ~9.2 µm or low NA of ~0.1 will result in an unacceptably high coupling loss due to a mode mismatch. Although in legacy implementations a sub-micron silicon waveguide may be used for high density optical components like hybrid lasers, optical amplifiers, and modulators, these implementations result in a small spot size. To increase performance, as described herein, it is important to increase the spot size to bring light in and out of a photonic chip efficiently.

As described herein, spot size converters have a low insertion loss for both fundamental transverse-electric (TE) and transverse-magnetic (TM) polarizations over an extended operating wavelength range, typically covering O-band to C-band, and low back reflection when integrated with an on-chip laser to ensure optical stability. In addition, the NA of the optical coupler, which may also be referred to as a spot size converter, should be nearly matched to a standard SMF to ensure low optical coupling loss when a SMF or an array is butt-coupled to the optical coupler. The butt-coupling should have a good degree of control with respect to fiber misalignment to ensure low coupling loss and reliability of the optical system over the operating lifetime.

Legacy implementations use a two-stage silicon inverse taper followed by a single stage, typically ~4 µm thick, adiabatic silicon nitride (SiN) lateral taper that is terminated by an etched facet that is anti-reflection coated to form an edge inverted taper (EIT) coupler. The typical NA of this legacy implementation achievable is ~0.32×0.32. In order to realize the legacy optical packaging solution, a refracting plano convex lens is attached at the facet using active alignment, that reduces the NA by ~3×, to enable low loss coupling to a fiber attach unit (FAU) (single or four channel). However, with this legacy implementation, added bill of materials cost due to inclusion of a mode expanding silicon lens and associated active alignment yield, and costs to attach lens and FAU subsequently. For a larger channel count, bare die warpage, depending on choice of packaging, for example flip chip vs wirebond, can significantly limit the yield of fiber coupling due to rigidity of the lens array and FAU.

Another legacy implementation expands a coupler optical mode by etching the silicon nitride layer and removing the Si substrate below the ~2 µm buried oxide layer to prevent substrate leakage. The resulting self-terminated V-grooves are formed using tetra methyl ammonium hydroxide (TMAH) based wet etching to define a trench wide enough to align, for example, a special reduced core 80 µm diameter fiber (RC80). However, with this legacy implementation, the use of non-standard fiber diameter for packaging will only be cost effective if it is available in large volumes. In addition, requiring a splice to a SMF will result in additional coupling loss. Silicon substrate removal dictates the need for adhesive vents that need to be filled with index matching epoxy (IME) to aid with mode expansion, and will reduce substrate leakage loss. Coupling loss is very sensitive to the fabrication tolerances of the SiN waveguide.

Another legacy implementation uses metamaterial silicon waveguide taper based photonic couplers that consists of islands of silicon carefully placed to prevent coupling to radiation modes, embedded in a thick suspended oxide membrane. TMAH based wet etching was employed to define a self-aligned V-groove in silicon such that the fiber center is aligned to the coupler waveguide. However, with this implementation, use of subwavelength gratings requires 193 nm immersion lithography, which is expensive, to improve resolution and thus consistently reduce back reflection (BR) of the spot size converter. The lowest BR design achieved is less than 31 dB, which is not sustainable when used on integrated transmitters containing hybrid lasers. Also, the top cladding is made of plasma-enhanced chemical vapor deposited (PECVD) oxide which typically has a larger refractive index variation in the third digit from water absorption due to porosity post deposition.

In addition, these legacy implementations were implemented on a buried oxide (BOX) silicon on insulator (SOI) greater than or equal to 2 μm, which is not viable for hybrid laser technology integration on the same chip, as that process requires a 1 μm BOX to allow sufficient thermal conduction for laser cooling.

Embodiments described herein are directed to low NA optical couplers, or spot size converters, that extend the ~4 μm thick SiN EIT and add an additional ~6 μm thick SiN layer that results in a ~10 μm total SiN thickness post polish. Embodiments may include an optical coupler with two or more SiN layers with lateral taper sections with no vertical taper section. In embodiments, the optical coupler may be initially formed from a single layer of SiN that is etched to form multiple layers. Embodiments may include an optical coupler with two or more SiN layers with lateral taper sections and a top layer that has a vertical adiabatic taper. In embodiments, the vertical tapering may be defined using two approaches: standard lithography with no vertical tapering, and 3D grayscale lithography for a vertical tapering design. The output waveguide dimensions of the optical coupler target an asymmetric NA but nearly matched to a SMF, and the Si horizontal tapers were redesigned from legacy implementations to support both polarizations (TE and TM). The optical coupler/spot size convertor may be self-aligned photolithographically to silicon V-grooves. These V-grooves may be defined using a TMAH wet etch process resulting in ~80 μm deep V-grooves, which may appear trapezoidal in cross section.

Embodiments that include a vertical tapering of the optical coupler allow the use of 3D grayscale lithography to have short overall coupler lengths of <1.5 mm with reduced back reflection, for example less than−35 dB. The optical mode is strongly confined in the larger core SiN waveguide, which is less susceptible to refractive index variations over time. This also allows the use of standard CMOS processes with SiO2 as antireflection coating for high volume manufacturing (HVM) thus achieving superior controlled mode matching. This allows passive alignment with high precision and potentially lower cost.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. It will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Figure 1:
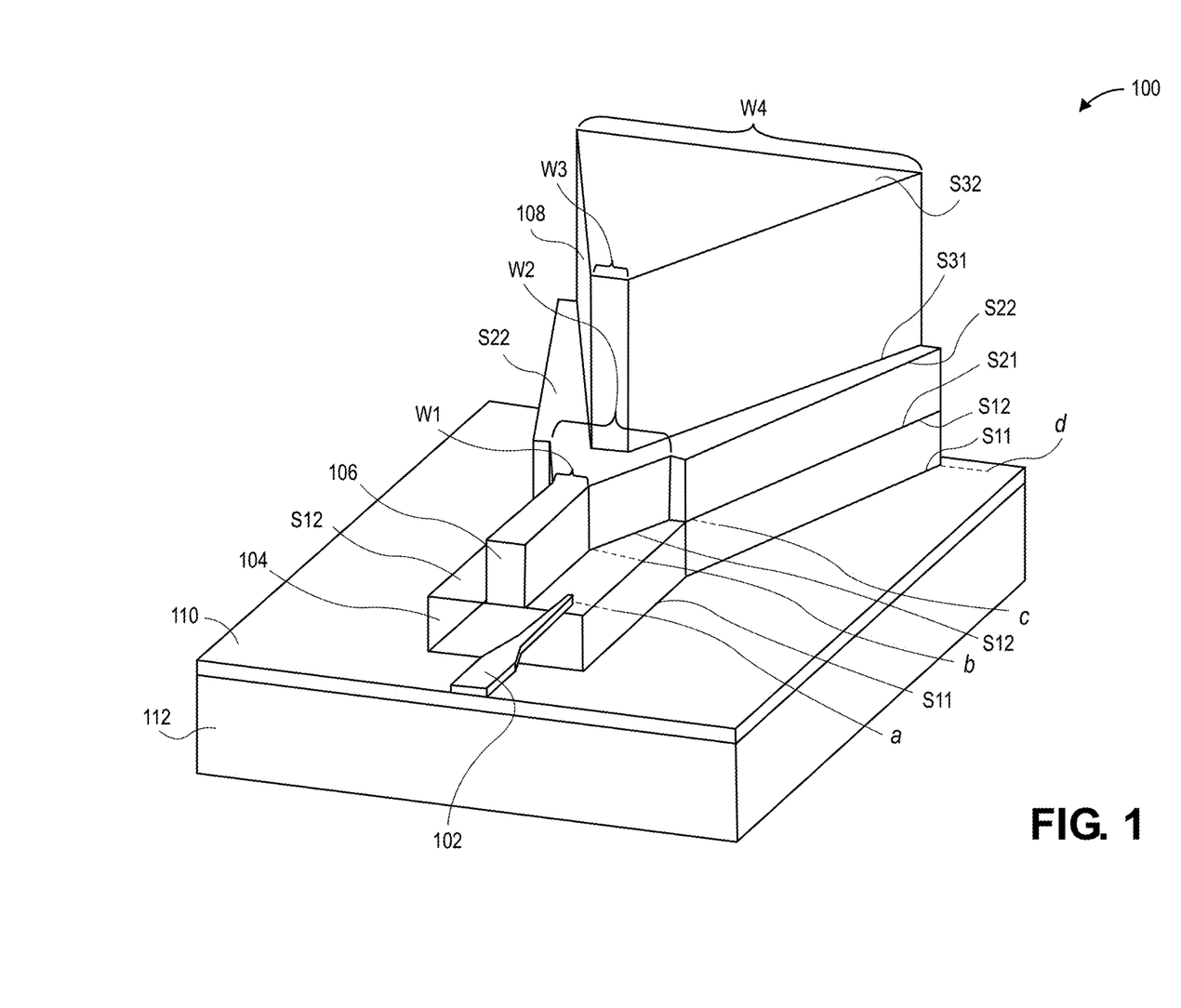
FIG. 1 is a perspective diagram of an embodiment of an optical coupler with three layers, in accordance with various embodiments.

FIG. 1 is a perspective diagram of an embodiment of an optical coupler with three layers, in accordance with various embodiments. Optical coupler 100 includes a waveguide interface 102, which is coupled with a first silicon nitride (SiN) layer 104. In embodiments, the waveguide interface 102 is coupled with the first SiN layer 104 at an edge S11 of the layer 104 and may be recessed into the first SiN layer 104, and extend to a location a. In embodiments, the waveguide interface 102 may be a silicon slab and include one or more reverse tapers as it extends into the first SiN layer 104 to location a. The first SiN layer 104 has a second side S12 opposite the first side S11.

A second SiN layer 106 has a first side S21 that is coupled with the second side S12 of the first SiN layer 104. The second SiN layer 106 may be completely overlapped by the first SiN layer 104. In embodiments, the second SiN layer 106 may extend at a width w1, down to location b, and then horizontally taper to a width w2 at location c. The second SiN layer 106 has a second side S22 opposite the first side S21.

A third SiN layer 108 has a first side S31 that is coupled with the second side S22 of the second SiN layer 106. The third SiN layer 108 may be completely overlapped by the second SiN layer 106. In embodiments, the third SiN layer 108 may horizontally taper from a width w3 at location c to a width w4 at location d. The third SiN layer 108 has a second side S32 opposite the first side S31. In embodiments, the second side S32 may be substantially parallel with the first side S31, as shown in optical coupler 100, and optical coupler 200 of FIG. 2. In embodiments, the second side S32 may not be parallel with the first side S31, and slope downward toward the waveguide interface 102, as shown with optical coupler 201 of FIG. 2. In embodiments, the SiN layers may also be silicon oxy nitride layers, or any other suitable material used for waveguides.

In embodiments, the first SiN layer 104 and the first side S21 of the second SiN layer 106 may be coupled with a BOX layer 110. The BOX layer 110 may be coupled with a silicon substrate 112. In embodiments, one or more of the first SiN layer 104, second SiN layer 106, and third SiN layer 108 may be constructed from a large SiN layer (not shown) and etched into the respective layers. In embodiments, one or more of the first SiN layer 104, second SiN layer 106, and third SiN layer 108 may be formed by repeated masking and deposition of SiN material.

Figure 2:
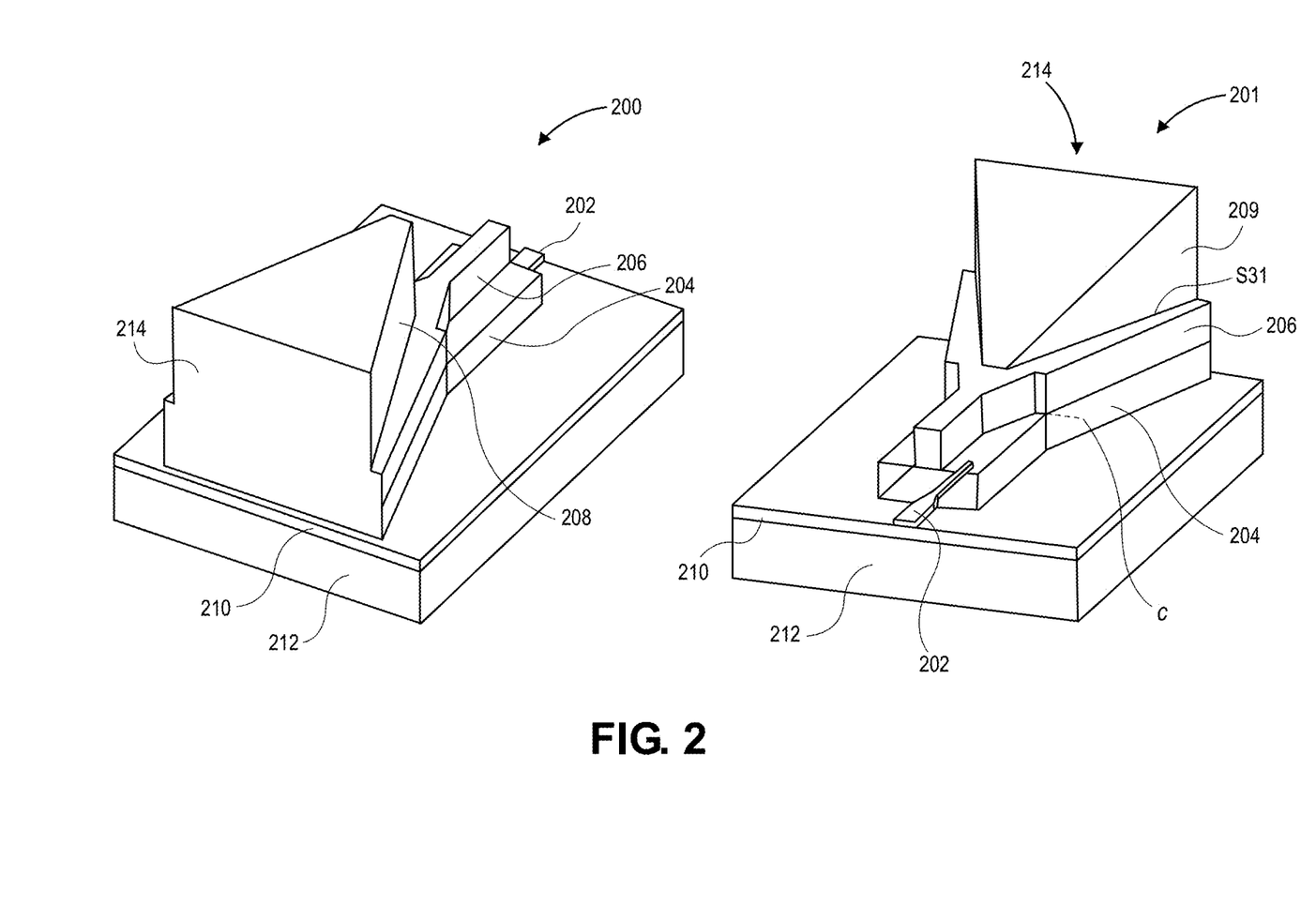
FIG. 2 is a perspective diagram of two optical couplers, one with a vertical taper and one without, in accordance with various embodiments.

FIG. 2 is a perspective diagram of two optical couplers, one with a vertical taper and one without, in accordance with various embodiments. The embodiment of optical coupler 200 may be similar to the embodiment of the optical coupler 100 of FIG. 1, but shown at a different perspective. Here, the silicon substrate 112, BOX 110, waveguide 202, first SiN layer 204, second SiN layer 206, and third SiN layer 208 are similar to their respective components in FIG. 1. In embodiments, the second SiN layer 206, and third SiN layer 208 this may be referred to as a "double cheese wedge."

Optical coupler 201, while similar in many respects to optical coupler 200, has a different structure of the third SiN layer 209. Third SiN layer 209 side S31 is parallel to sides S21 and S22 of second SiN layer 206. However, third SiN layer 209 side S32 is not parallel to S31, but instead vertically tapers from a location c to location d.

With respect optical coupler 200 and optical coupler 201, a face 214 is created as a plane that includes edges of first SiN layer 204, second SiN layer 206, and third SiN layer 208 is formed. The face 214 may serve as a fiber interface with a fiber, for example when a SMF (not shown) is butt-coupled with the face 214.

Figure 3:
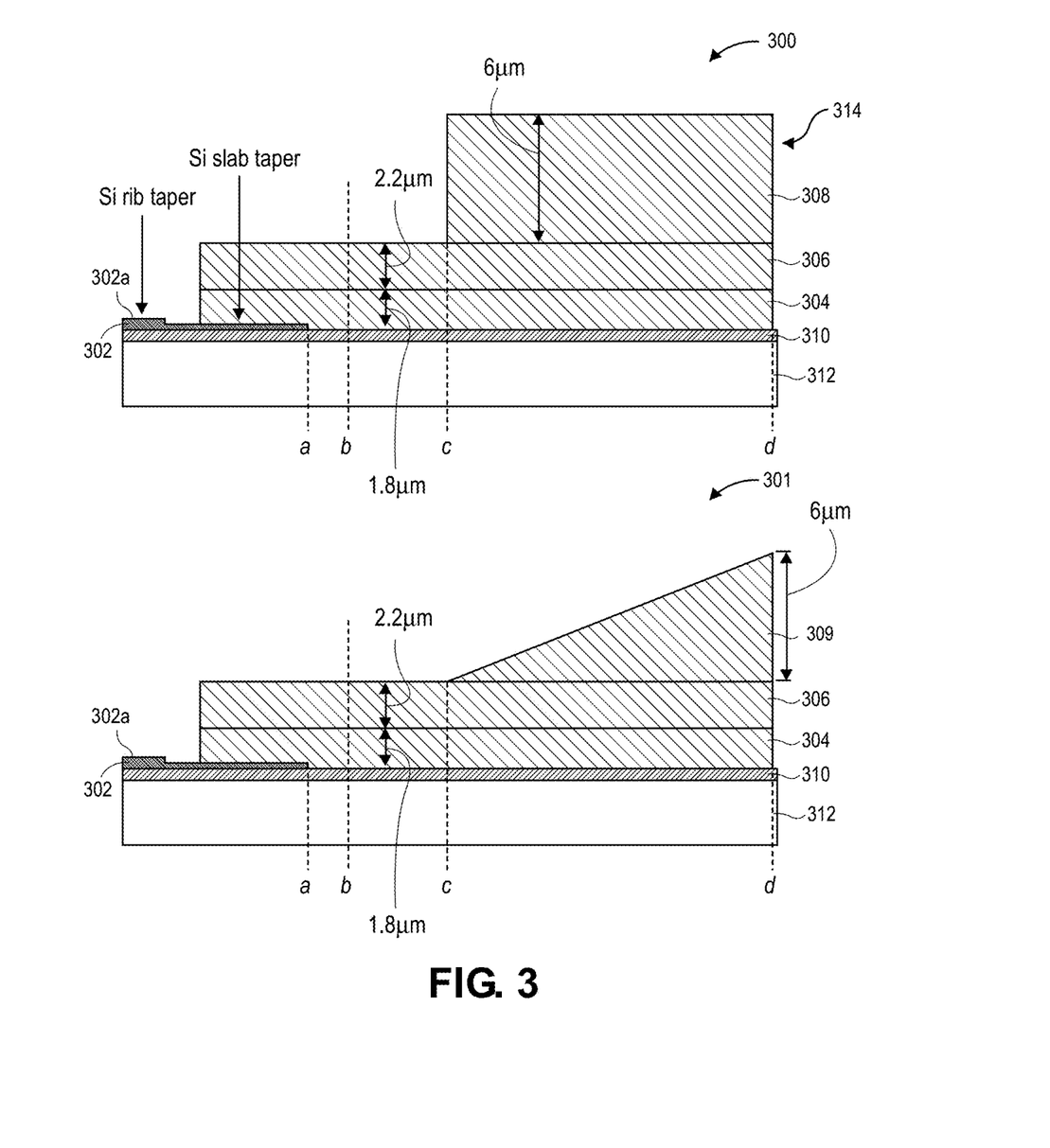
FIG. 3 is a side view of two optical couplers, one embodiment with a vertical taper and one embodiment without, in accordance with various embodiments.

FIG. 3 is a side view of two optical couplers, one embodiment with a vertical taper and one embodiment without, in accordance with various embodiments. Optical coupler 300, which may be similar to optical coupler 200 of FIG. 2 and optical coupler 100 of FIG. 1, and optical coupler 301, which may be similar to optical coupler 201 of FIG. 2, are both examples of a thick SiN low NA spot size converter.

Optical coupler 300 is a side view of optical coupler 200 of FIG. 2, and includes a waveguide interface 302, with a silicon rib taper 302a, that extends to location a. A BOX layer 310, silicon substrate 312, first SiN layer 304, second SiN layer 306, and third SiN layer 308 may be similar to BOX layer 210, silicon substrate 212, first SiN layer 204, second SiN layer 206, and third SiN layer 208 of FIG. 2. As shown, the combined thickness of second SiN layer 306 having a range of 1.5-4 µm, and third SiN layer 308 having a range of 2-8 µm, particularly on top of the first SiN layer 304 at a range of 1.5-4 µm, is a design that may entirely confines the light within the SiN waveguide region during the entire optical mode transformation past the silicon taper of the waveguide interface 302.

In embodiments, at the optical fiber interface 314, which may be similar to face 214 of FIG. 2, the thick SiN low NA optical coupler 300 and optical coupler 301 may have varying dimensions. By integrating in a larger SiN layer thickness, light transitions from the silicon waveguide interface 302 into the series of larger SiN layers (304, 306, 308, 309) through lateral tapering, this creates lower effective refractive index regions within the coupler. This results in an adiabatic taper transition with low loss.

Advantages of optical coupler 300 is that the fabrication process is consistent with the standard volume CMOS fabrication process, requiring only the need to incorporate thick SiN and photo-resist layers to enable the thick laterally-tapered SiN regions into the thick SiN low NA optical coupler. Advantages of optical coupler 301 is that the vertical tapering may support a shorter device, and potentially reduced overall back reflection due to a less abrupt interface at the start of third SiN layer 309 at location c, in comparison to third SiN layer 308 at location c.

Figure 4:
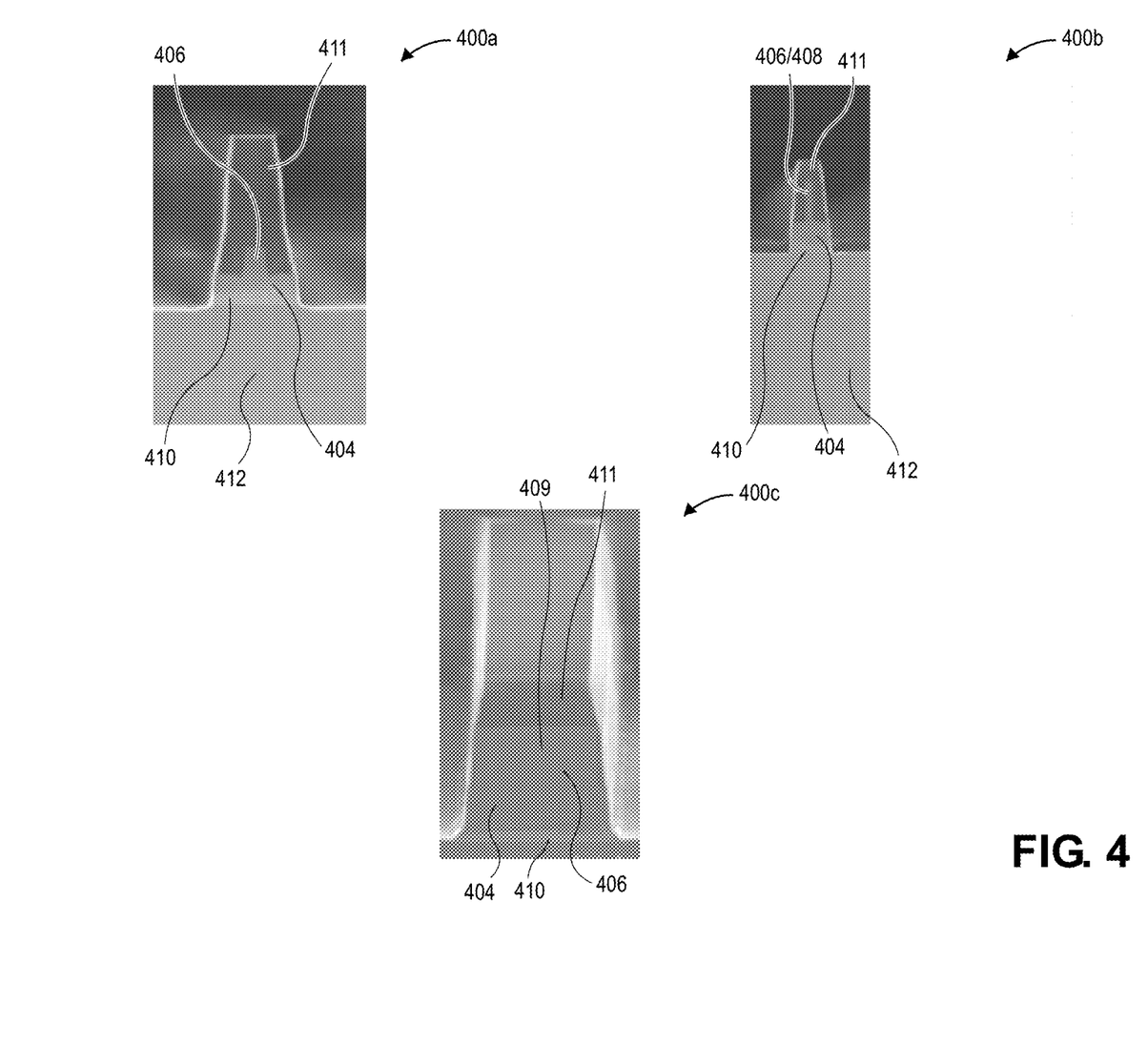
FIG. 4 are various cross-sections of embodiments of an optical coupler without a vertical taper, in accordance with various embodiments.

FIG. 4 are various cross-sections of embodiments of an optical coupler without a vertical taper, in accordance with various embodiments. Cross-sections 400a, 400b, 400c show the thick SiN rib waveguides corresponding to cross-sections of optical coupler 100 of FIG. 1. Each cross-section includes a silicon layer 412, a BOX layer 410, a first SiN layer 404, and a second and/or a third SiN layer 406/408, which are similar to silicon layer 112, a BOX layer 110, a first SiN layer 104, and a second and/or third SiN layer 106/108 of FIG. 1. Cross-section 400c is near the facet (not shown) that is similar to the facet 214 of optical coupler 200 of FIG. 2. Note that all cross-sections 400a, 400b, 400c show a top layer of photo-resist 411 on top of the waveguides that has not been removed.

In embodiments, a three-stage etch recipe may be used to fabricate the thick SiN waveguide optical coupler. A first lithography and dry etch process may be used to pattern the third SiN layer 408, this process was followed by two subsequent lithography and dry etch fabrication processes to define the second SiN layer 406 and first SiN layer 402 lateral dimensions and output coupling facet respectively.

A similar fabrication process may be used for the 3D-taper thick SiN waveguide optical coupler 201 of FIG. 2, with the first etch process altered to create the gray scale lithography process mentioned above to create a vertical taper in the third SiN layer 409.

Figure 5:
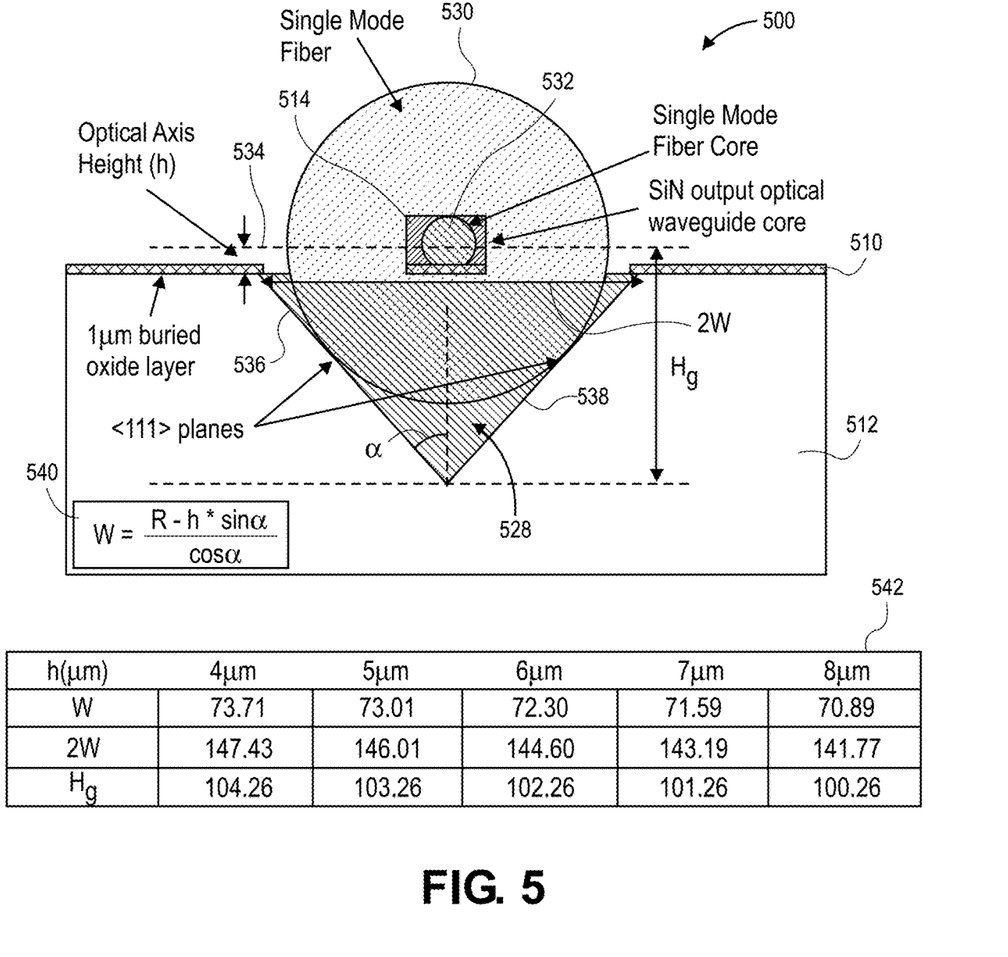
FIG. 5 is a side diagram showing dimensions of a V-groove to align fiber with an optical coupler, in accordance with various embodiments.

FIG. 5 is a side diagram showing dimensions of a V-groove to align fiber with an optical coupler, in accordance with various embodiments. The side diagram 500 shows a SMF 530 having a fiber core 532 that sits within a trench 528 in a silicon substrate 512. The trench 528 is designed so that when the SMF 530 sets in the trench 528, it rests against <111> planes 536, 538.

This causes the fiber core 532 to be aligned with the SiN output wave guide facet 514, which may be similar to facet 214 of diagrams 200, 201 of FIG. 2. In embodiments, this creates a self-aligned coupling between the fiber core 532 and the waveguide facet 514.

In embodiments, the trench 528 may be referred to as a V-groove. V-groove target widths may be identified on bare silicon wafers where an BOX 510 may be deposited using CVD process to act as an hard mask during the anisotropic wet etch process using TMAH of crystalline silicon along <111> planes 536, 538. Based on the nominal SiN waveguide facet 514 dimensions and SMF 530 diameter (as shown, ~125 µm) an analytical expression can be derived to determine the required V-groove 528 width and depth as shown in equation 540 and table 542. The optical axis height 534 is above the BOX 510/silicon substrate 512 interface, requiring a specific target V-groove width (2 W) and height Hg respectively. Note that the equation 540 describes the relationship between the fiber core 532 center and the Optical Axis Height 534. For example, a width of 4 µm or so, the target V-groove width 2 W would be as shown in table 542.

Figure 6:
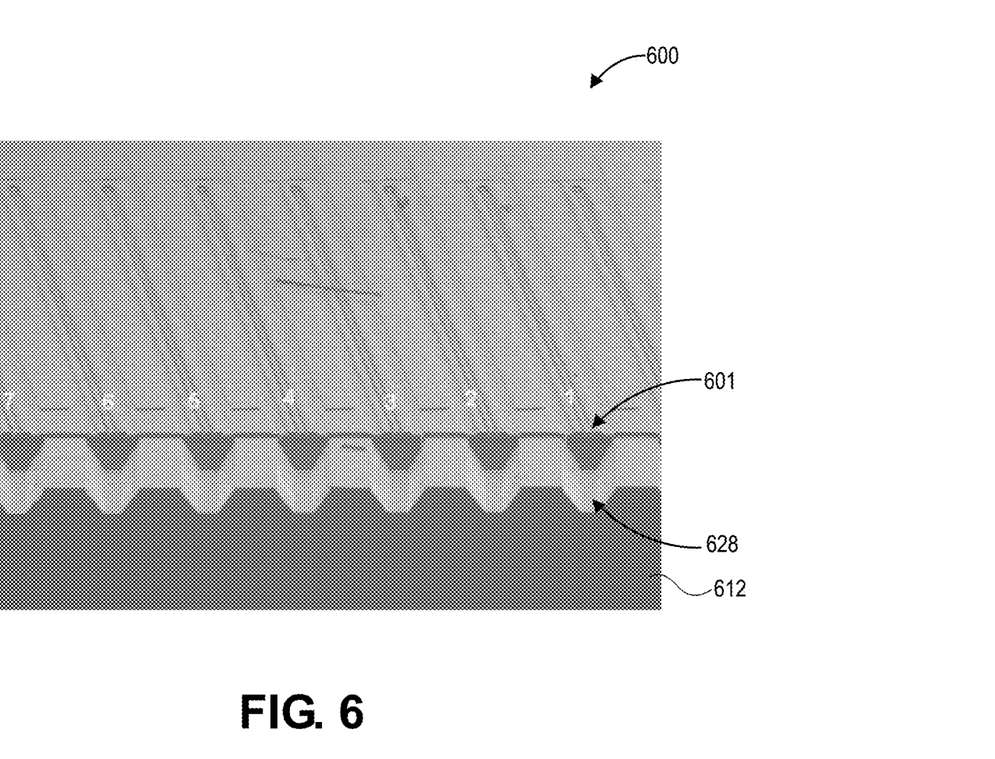
FIG. 6 shows a perspective view of one or more V-grooves in a silicon substrate for coupling with one or more optical couplers, in accordance with various embodiments.

FIG. 6 shows a perspective view of one or more V-grooves in a silicon substrate for coupling with one or more optical couplers, in accordance with various embodiments. FIG. 600 shows a perspective view of an array of V-grooves 628, which may be similar to V-grooves 528 of FIG. 5, self-aligned to an array of locations 601 two which optical couplers, for example optical couplers 200, 201 of FIG. 2, may be separated laterally. The optical coupler taper structure is angled laterally (along wafer plane) so that the SiN facet back reflection is minimized and the lateral facet etch angle is lithographically defined such that optical beam refracts parallel to direction of the Si V-grooves for a particular refractive index of SiN material.

Figure 7:
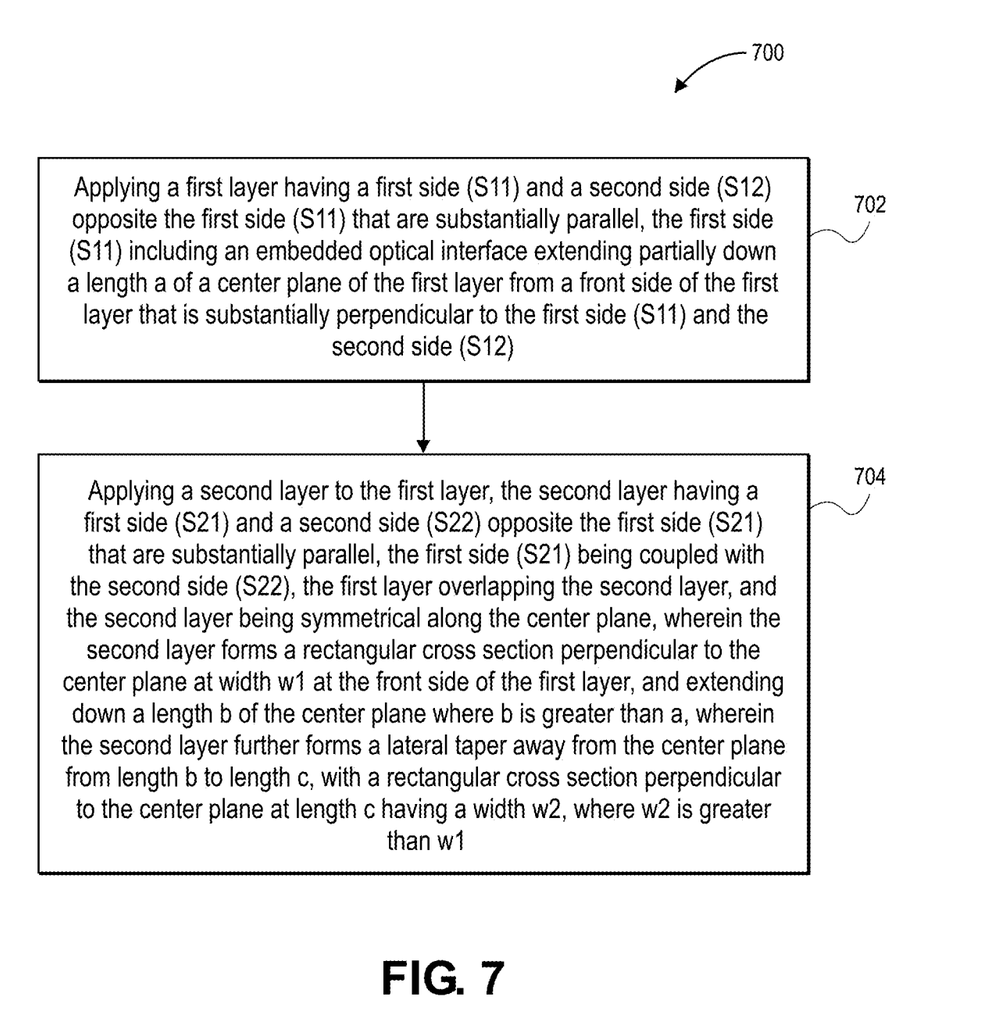
FIG. 7 is a process for creating a portion of an optical coupler, in accordance with various embodiments.

FIG. 7 is a process for creating a portion of an optical coupler, in accordance with various embodiments. Process 700 may be implemented using the components and techniques as described herein, and in particular with respect to FIGS. 1-4.

At block 702, the process may include applying a first layer having a first side (S11) and a second side (S12) opposite the first side (S11) that are substantially parallel, the first side (S11) including an embedded optical interface extending partially down a length a of a center plane of the first layer from a front side of the first layer that is substantially perpendicular to the first side (S11) and the second side (S12). In embodiments, the first layer may be similar to first SiN layer 104 of FIG. 1, first SiN layers 204 of optical couplers 200, 201 of FIG. 2, or first SiN layers 304 of optical couplers 300, 301 of FIG. 3. In embodiments, a silicon waveguide such as silicon waveguide 102 of FIG. 1 may be embedded in the first layer.

At block 704, the process may include applying a second layer to the first layer, the second layer having a first side (S21) and a second side (S22) opposite the first side (S21) that are substantially parallel, the first side (S21) being coupled with the second side (S22), the first layer overlapping the second layer, and the second layer being symmetrical along the center plane, wherein the second layer forms a rectangular cross section perpendicular to the center plane at width w1 at the front side of the first layer, and extending down a length b of the center plane where b is greater than a, wherein the second layer further forms a lateral taper away from the center plane from length b to length c, with a rectangular cross section perpendicular to the center plane at length c having a width w2, where w2 is greater than w1.

In embodiments, the second layer may be similar to the second SiN layer 106 of FIG. 1, second SiN layers 206 of optical couplers 200, 201 of FIG. 2, or second SiN layers 306 of optical couplers 300, 301 of FIG. 3.

Additional blocks may include applying a third layer to the second layer, the third layer having a first side (S31) and a second side (S32) opposite the first side (S31), the first side (S31) being coupled with the second side (S32), wherein the third layer does not overlap the second layer and the third layer is symmetrical along the center plane, wherein the third layer further forms a lateral taper away from the center plane from length c to length d, with a rectangular cross-section perpendicular to the center plane at length c having a width w3, where w3 is less than or equal to w2, and a width of the rectangular cross-section perpendicular to the center plane at length d is w4, where w4 is greater than w3.

In embodiments, the third layer may be similar to the third SiN layer 108 of FIG. 1, third SiN layer 208 of optical coupler 200, third SiN layer 209 of optical coupler 201 of FIG. 2, third SiN layer 308 of optical coupler 300, or third SiN layer 309 of optical coupler 301 of FIG. 3.

Figure 8:
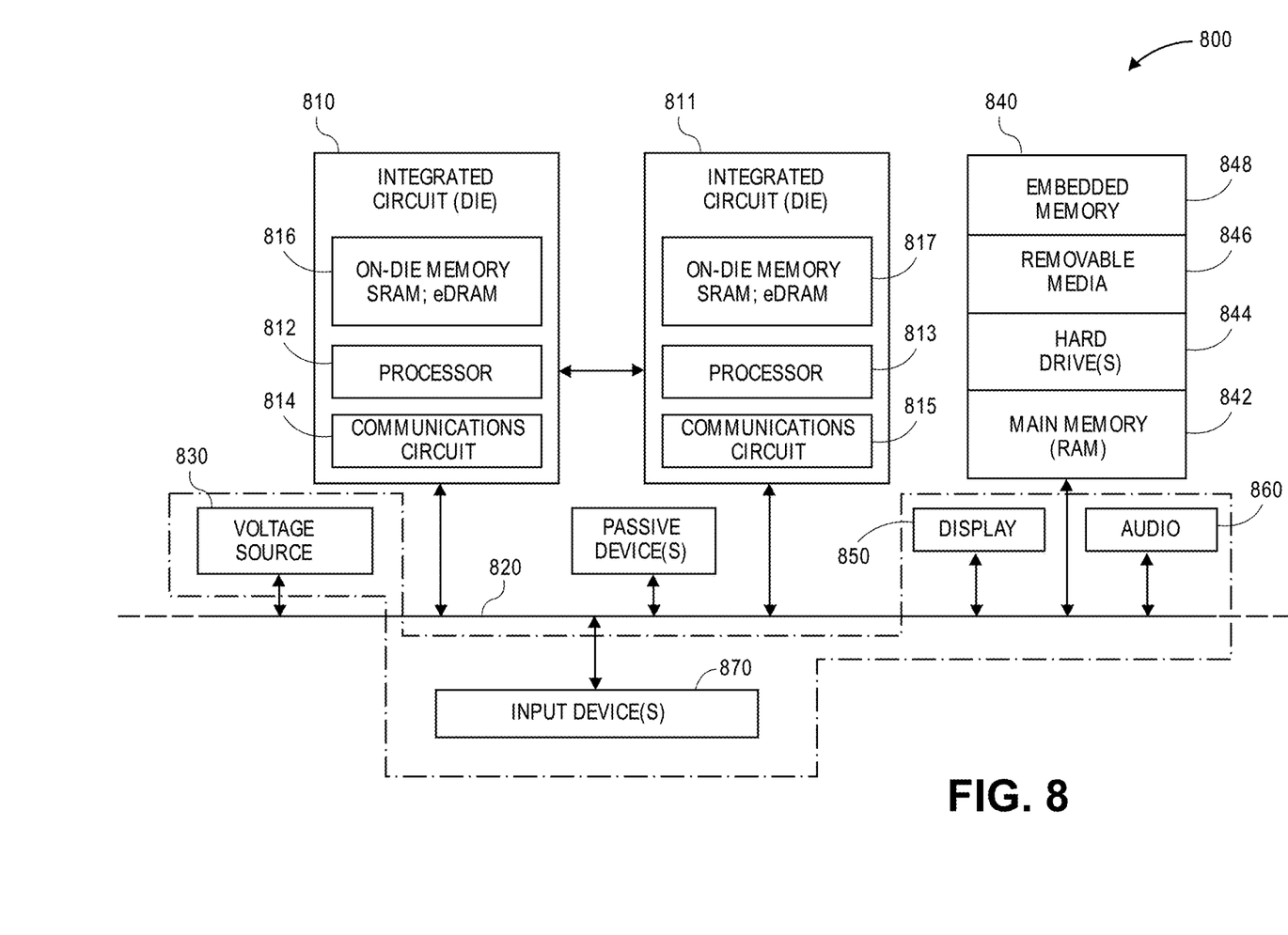
FIG. 8 schematically illustrates a computing device 800 in accordance with one embodiment.

Embodiments of the present disclosure may be implemented into a system using any suitable hardware and/or software to configure as desired. FIG. 8 schematically illustrates a computing device 800 in accordance with one embodiment. The computer system 800 (also referred to as the electronic system 800) as depicted can embody a multi-layer optical coupler, according to any of the several disclosed embodiments and their equivalents as set forth in this disclosure. In particular, one or more of the communication circuits 814, 815 may embody a multi-layer optical coupler. The computer system 800 may be a mobile device such as a netbook computer. The computer system 800 may be a mobile device such as a wireless smart phone. The computer system 800 may be a desktop computer. The computer system 800 may be a hand-held reader. The computer system 800 may be a server system. The computer system 800 may be a supercomputer or high-performance computing system.

In an embodiment, the electronic system 800 is a computer system that includes a system bus 820 to electrically couple the various components of the electronic system 800. The system bus 820 is a single bus or any combination of busses according to various embodiments. The electronic system 800 includes a voltage source 830 that provides power to the integrated circuit 810. In some embodiments, the voltage source 830 supplies current to the integrated circuit 810 through the system bus 820.

The integrated circuit 810 is electrically coupled to the system bus 820 and includes any circuit, or combination of circuits according to an embodiment. In an embodiment, the integrated circuit 810 includes a processor 812 that can be of any type. As used herein, the processor 812 may mean any type of circuit such as, but not limited to, a microprocessor, a microcontroller, a graphics processor, a digital signal processor, or another processor. In an embodiment, the processor 812 includes, or is coupled with, a multi-layer optical coupler, as disclosed herein. In an embodiment, SRAM embodiments are found in memory caches of the processor. Other types of circuits that can be included in the integrated circuit 810 are a custom circuit or an application-specific integrated circuit (ASIC), such as a communications circuit 814 for use in wireless devices such as cellular telephones, smart phones, pagers, portable computers, two-way radios, and similar electronic systems, or a communications circuit for servers. In an embodiment, the integrated circuit 810 includes on-die memory 816 such as static random-access memory (SRAM). In an embodiment, the integrated circuit 810 includes embedded on-die memory 816 such as embedded dynamic random-access memory (eDRAM).

In an embodiment, the integrated circuit 810 is complemented with a subsequent integrated circuit 811. Useful embodiments include a dual processor 813 and a dual communications circuit 815 and dual on-die memory 817 such as SRAM. In an embodiment, the dual integrated circuit 810 includes embedded on-die memory 817 such as eDRAM.

In an embodiment, the electronic system 800 also includes an external memory 840 that in turn may include one or more memory elements suitable to the particular application, such as a main memory 842 in the form of RAM, one or more hard drives 844, and/or one or more drives that handle removable media 846, such as diskettes, compact disks (CDs), digital variable disks (DVDs), flash memory drives, and other removable media known in the art. The external memory 840 may also be embedded memory 848 such as the first die in a die stack, according to an embodiment.

In an embodiment, the electronic system 800 also includes a display device 850, an audio output 860. In an embodiment, the electronic system 800 includes an input device such as a controller 870 that may be a keyboard, mouse, trackball, game controller, microphone, voice-recognition device, or any other input device that inputs information into the electronic system 800. In an embodiment, an input device 870 is a camera. In an embodiment, an input device 870 is a digital sound recorder. In an embodiment, an input device 870 is a camera and a digital sound recorder.

As shown herein, the integrated circuit 810 can be implemented in a number of different embodiments, including a package having a multi-layer optical coupler, according to any of the several disclosed embodiments and their equivalents, an electronic system, a computer system, one or more methods of fabricating an integrated circuit, and one or more methods of fabricating an electronic assembly that includes a package having a multi-layer optical coupler, according to any of the several disclosed embodiments as set forth herein in the various embodiments and their art-recognized equivalents. The elements, materials, geometries, dimensions, and sequence of operations can all be varied to suit particular I/O coupling requirements including array contact count, array contact configuration for a microelectronic die embedded in a processor mounting substrate according to any of the several disclosed multi-layer optical coupler and their equivalents. A foundation multi-layer PCB may be included, as represented by the dashed line of FIG. 8. Passive devices may also be included, as is also depicted in FIG. 8.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

Some non-limiting examples are provided below.

EXAMPLES

Example 1 is a silicon photonics integrated apparatus, comprising: a first layer with a first side (S11) and a second side (S12) opposite the first side (S11) that are substantially parallel, the first side (S11) including an embedded optical interface extending partially down a length a of a center plane of the first layer from a front side of the first layer that is substantially perpendicular to the first side (S11) and the second side (S12); and a second layer having a first side (S21) and a second side (S22) opposite the first side (S21) that are substantially parallel, the first side (S21) being coupled with the second side (S22), the first layer overlapping the second layer, and the second layer being symmetrical along the center plane, wherein the second layer forms a rectangular cross section perpendicular to the center plane at width w1 at the front side of the first layer, and extending down a length b of the center plane where b is greater than a, wherein the second layer further forms a lateral taper away from the center plane from length b to length c, with a rectangular cross section perpendicular to the center plane at length c having a width w2, where w2 is greater than w1.

Example 2 may include the silicon photonics integrated apparatus of example 1, further comprising: a third layer having a first side (S31) and a second side (S32) opposite the first side (S31), the first side (S31) being coupled with the second side (S32), wherein the third layer does not overlap the second layer and the third layer is symmetrical along the center plane, wherein the third layer further forms a lateral taper away from the center plane from length c to length d, with a rectangular cross-section perpendicular to the center plane at length c having a width w3, where w3 is less than or equal to w2, and a width of the rectangular cross-section perpendicular to the center plane at length d is w4, where w4 is greater than w3.

Example 3 may include the apparatus of example 2, further comprising wherein the first side (S31) and the second side (S32) are substantially parallel.

Example 4 may include the apparatus of example 2, wherein the third layer further forms a vertical taper away from the first side (S31).

Example 5 may include the apparatus of example 2, wherein the first, second and third layers are waveguide layers.

Example 6 may include the apparatus of any one of examples 2-5, wherein the first, second and third layers are silicon nitride (SiN) layers or silicon oxy nitride layers.

Example 7 may include the apparatus of any one of examples 2-5, wherein w3=w2.

Example 8 is a method for manufacturing a silicon photonics integrated apparatus, the method comprising: applying a first layer having a first side (S11) and a second side (S12) opposite the first side (S11) that are substantially parallel, the first side (S11) including an embedded optical interface extending partially down a length a of a center plane of the first layer from a front side of the first layer that is substantially perpendicular to the first side (S11) and the second side (S12); applying a second layer to the first layer, the second layer having a first side (S21) and a second side (S22) opposite the first side (S21) that are substantially parallel, the first side (S21) being coupled with the second side (S22), the first layer overlapping the second layer, and the second layer being symmetrical along the center plane, wherein the second layer forms a rectangular cross section perpendicular to the center plane at width w1 at the front side of the first layer, and extending down a length b of the center plane where b is greater than a, wherein the second layer further forms a lateral taper away from the center plane from length b to length c, with a rectangular cross section perpendicular to the center plane at length c having a width w2, where w2 is greater than w1.

Example 9 may include the method of example 8, further comprising, prior to applying the first layer, applying a buried oxide layer; and wherein the first layer is applied to the buried oxide layer.

Example 10 may include the method of example 9, wherein the buried oxide layer is coupled with a substrate.

Example 11 may include the method of example 8, further comprising applying a third layer to the second layer, the third layer having a first side (S31) and a second side (S32) opposite the first side (S31), the first side (S31) being coupled with the second side (S32), wherein the third layer does not overlap the second layer and the third layer is symmetrical along the center plane, wherein the third layer further forms a lateral taper away from the center plane from length c to length d, with a rectangular cross-section perpendicular to the center plane at length c having a width w3, where w3 is less than or equal to w2, and a width of the rectangular cross-section perpendicular to the center plane at length d is w4, where w4 is greater than w3.

Example 12 may include the method of example 11, further comprising wherein the first side (S31) and the second side (S32) are substantially parallel.

Example 13 include the method of example 11, wherein the third layer further forms a vertical taper away from the first side (S31).

Example 14 may include the method any one of examples 8-13, wherein the first, second, and third layers are silicon nitride (SiN) layers or silicon oxy nitride layers.

Example 15 may include the method of any one of examples 8-13, wherein w3=w2.

Example 16 is a system, comprising: a substrate that includes a first side and a second side opposite the first side, the first side includes one or more V-grooves that are parallel to each other and are open to the first side of the substrate, wherein the one or more V-grooves terminate at one or more locations on the substrate; one or more silicon photonics integrated apparatuses coupled with the first side of the substrate, each having a face located proximate to the one or more V-groove termination locations; wherein one or more fiber optic cables are to be positioned, respectively within the one or more V-grooves to optically couple with, respectively, faces of the one or more silicon photonics integrated apparatuses.

Example 17 may include the system of example 16, further including the one or more fiber-optic cables.

Example 18 may include the system of example 17, wherein the one or more fiber-optic cables are butt-coupled, respectively, to the faces of the one or more silicon photonics integrated apparatuses.

Example 19 may include the system of example 16, wherein the one or more V-grooves are not perpendicular to a plane of the face, respectively, of the one or more silicon photonics integrated apparatuses to control back reflection.

Example 20 may include the system of any one of example 16-19, wherein the one or more V-grooves have a flat bottom that is substantially parallel to a surface of the substrate.

We claim:

1. A silicon photonics integrated apparatus comprising:
   a substrate;
   a first layer comprising silicon adjacent to the substrate, wherein the first layer comprising silicon includes a first linear portion and a first tapered portion;
   a second layer comprising silicon adjacent to the first layer comprising silicon, wherein the second layer comprising silicon includes a second linear portion that partially overlaps the first linear portion and a second tapered portion that overlaps the first tapered portion; and
   a third layer comprising silicon adjacent to the second layer comprising silicon, wherein the third layer comprising silicon includes a tapered portion that at least partially overlaps the second tapered portion, and wherein the third layer comprising silicon does not overlap the second linear portion.

2. The silicon photonics integrated apparatus of claim 1, wherein the third layer of silicon has a first height at a portion of the third layer comprising silicon that is closest to the second tapered portion and a second height at a portion comprising the third layer comprising silicon that is furthest from the second tapered portion, and wherein the first height is less than the second height.

3. The silicon photonics integrated apparatus of claim 2, wherein the first height is 0, and wherein the height of the third layer comprising silicon increases linearly from the first height to the second height.

4. The silicon photonics integrated apparatus of claim 1, wherein the first, second, and third layer comprising silicon are waveguide layers that are configured to allow light to propagate along a center plane of the silicon photonics integrated apparatus.

5. The silicon photonics integrated apparatus of claim 4, wherein the first, second, and third layer comprising silicon are symmetrical along the center plane.

6. The silicon photonics integrated apparatus of claim 1, wherein the first, second, or third layer comprising silicon include silicon nitride (SiN) or silicon oxy nitride.

7. An electronic device comprising:
   a light source to provide an optical signal; and
   an optical apparatus configured to propagate the optical signal along a central plane of the optical apparatus, wherein the optical apparatus comprises:
      a substrate;
      a first layer comprising silicon adjacent to the substrate, wherein the first layer comprising silicon includes a first linear portion and a first tapered portion;
      a second layer comprising silicon adjacent to the first layer comprising silicon, wherein the second layer comprising silicon includes a second linear portion that partially overlaps the first linear portion and a second tapered portion that overlaps the first tapered portion; and
      a third layer comprising silicon adjacent to the second layer comprising silicon, wherein the third layer comprising silicon includes a tapered portion that at least partially overlaps the second tapered portion, and wherein the third layer comprising silicon does not overlap the second linear portion.

8. The electronic device of claim 7, wherein the third layer comprising silicon has a first height at a portion of the third layer comprising silicon that is closest to the second tapered portion and a second height at a portion of the third layer comprising silicon that is furthest from the second tapered portion, and wherein the first height is less than the second height.

9. The electronic device of claim 8, wherein the first height is 0, and wherein the height of the third layer increases linearly from the first height to the second height.

10. The electronic device of claim 7, wherein the first, second, and third layer comprising silicon are symmetrical along the central plane.

11. The electronic device of claim 7, wherein the first, second, or third layer comprising silicon include silicon nitride (SiN) or silicon oxy nitride.

12. A method of forming an optical apparatus, wherein the method comprises:
- identifying a substrate;
- forming a first layer comprising silicon adjacent to the substrate, wherein the first layer comprising silicon includes a first linear portion and a first tapered portion;
- forming a second layer comprising silicon adjacent to the first layer comprising silicon, wherein the second layer comprising silicon includes a second linear portion that partially overlaps the first linear portion and a second tapered portion that overlaps the first tapered portion; and
- forming a third layer comprising silicon adjacent to the second layer comprising silicon, wherein the third layer comprising silicon includes a tapered portion that at least partially overlaps the second tapered portion, and wherein the third layer comprising silicon does not overlap the second linear portion.

13. The method of claim 12, wherein the third layer comprising silicon has a first height at a portion comprising the third layer comprising silicon that is closest to the second tapered portion and a second height at a portion of the third layer comprising silicon that is furthest from the second tapered portion, and wherein the first height is less than the second height.

14. The method of claim 13, wherein the first height is 0, and wherein the height of the third layer increases linearly from the first height to the second height.

15. The method of claim 12, wherein the first, second, and third layer efcomprising silicon are waveguide layers that are configured to allow light to propagate along a center plane comprising a silicon photonics integrated apparatus.

16. The method of claim 15, wherein the first, second, and third layer comprising silicon are symmetrical along the center plane.

17. The method of claim 12, wherein the first, second, or third layer comprising silicon include silicon nitride (SiN) or silicon oxy nitride.

* * * * *